United States Patent
Yegnan et al.

(10) Patent No.: US 7,394,379 B2
(45) Date of Patent: Jul. 1, 2008

(54) UNIQUE METHOD FOR EMBEDDING BUSINESS PROCESS INTO RFID GRID

(76) Inventors: Kaushik Tiruvadi Yegnan, A/141 "Meghdoot" Rata Peth, Pune- 411 011, Maharashtra State (IN); Surendra Kancherla, C-9, 'Ujjwal', Pandurangwadi, Lane 6, Goregaon (E), Mumbai - 400 063, Maharashtra State (IN)

(*) Notice: Subject to any disclaimer, the term of this patent is extended or adjusted under 35 U.S.C. 154(b) by 159 days.

(21) Appl. No.: 11/283,390

(22) Filed: Nov. 18, 2005

(65) Prior Publication Data

US 2006/0109126 A1    May 25, 2006

(30) Foreign Application Priority Data

Nov. 19, 2004  (IN) .................................... 1245/04

(51) Int. Cl.
*G08B 13/14* (2006.01)
(52) U.S. Cl. .................................. 340/572.1; 340/572.4
(58) Field of Classification Search ............. 340/572.1, 340/572.4, 825.49; 235/375, 376; 707/104.1, 707/200
See application file for complete search history.

(56) References Cited

U.S. PATENT DOCUMENTS

| | | | | |
|---|---|---|---|---|
| 4,141,078 | A * | 2/1979 | Bridges et al. | 235/375 |
| 4,837,568 | A * | 6/1989 | Snaper | 340/572.4 |
| 6,992,587 | B2 * | 1/2006 | Maeda et al. | 340/572.1 |
| 7,085,775 | B2 * | 8/2006 | Short et al. | 707/104.1 |
| 7,212,120 | B2 * | 5/2007 | Gudat | 340/572.1 |
| 7,230,520 | B2 * | 6/2007 | Zaretsky et al. | 340/572.1 |

* cited by examiner

*Primary Examiner*—John Tweel, Jr.
(74) *Attorney, Agent, or Firm*—Notaro & Michalos P.C.

(57) ABSTRACT

A system and method is provided for embedding business process into an RFID grid. The system includes at least an RFID Transceiver (Reader) s and antennae that read RFID Transponders (Tags) of multiple frequencies and multiple protocols as RFID hardware devices. A first computer program automatically discovers, configures and controls the RFID hardware devices. A computer memory system, connected to the RFID hardware devices, stores discovery, configuration, and control data. A second computer program is used to automatically and remotely receive data from the system and to automatically generate a graphical display of all RFID hardware devices. A third computer program embeds location information in terms of physical business context and zone definitions into the hardware RFID devices.

6 Claims, 8 Drawing Sheets

UNIQUE METHOD FOR EMBEDDING BUSINESS PROCESS INTO RFID GRID

FIELD AND BACKGROUND OF THE INVENTION

The present invention relates to embedding business process and business process intelligence into an RFID hardware device (Radio Frequency Identification) grid which is an integral and central part of an RFID based business solution for any business or functional area.

More particularly, the present invention relates to a system that allows definition and execution of any business process and business process intelligence involving tracking of removeable and immovable physical objects to be embedded into an RFID (Radio Frequency Identification) grid built of RFID (Radio Frequency Identification) devices deployed across the environment that covers the overall process, thereby providing the flexibility to define any application for any business or functional area, to incorporate any changes to the existing business process rules or business process intelligence.

PRIOR ART

Radio frequency identification ("RFID") Transponder (Tag) s and radio frequency identification Transponder (Tag) systems are known, and find numerous uses. For example, radio frequency identification Transponder (Tag) are frequently used for personal identification in automated gate sentry applications protecting secured buildings or areas. Information stored on the radio frequency identification Transponder (Tag) identifies the person seeking access to the secured building. Older systems require the person accessing the building to insert or swipe a programmed identification Transponder (Tag) into or through a Reader for the system to read the information from the identification Transponder (Tag). Radio frequency identification Transponder (Tag) conveniently reads the information from the radio frequency identification Transponder (Tag) at a small distance using radio frequency ("RF") data transmission technology, eliminating the inserting or swiping operation. Most typically, the user simply holds or places the radio frequency identification Transponder (Tag) near a base station, which is coupled to a security system securing the building or area. The base station transmits an actuation signal to the radio frequency identification Transponder (Tag) that powers circuitry contained on the radio frequency identification Transponder (Tag). The circuitry, responsive to the actuation signal, communicates the stored information from the radio frequency identification Transponder (Tag) to the base station, which receives and decodes the information. The read information is communicated to the security system and, if appropriate, access is granted to the individual. In general, radio frequency identification Transponder (Tag) s are capable of retaining and, in operation, transmitting a substantial amount of information-sufficient information to uniquely identify individuals, packages, inventory and the like.

U.S. Pat. No. 6,496,112 describes a radio frequency identification Transponder (Tag) that includes stored Transponder (Tag) information and at least one antenna element. The Transponder (Tag) also includes a programmable Transponder (Tag) circuit state that is either "on" or "off" based on an "on/off" command signal received by the antenna element. When the Transponder (Tag) circuit state is "on," upon receiving an exciter signal from a proximately located electrostatic exciter the Transponder (Tag) becomes energized, thereby causing it to generate a read signal containing a carrier signal based on the stored Transponder (Tag) information. The antenna element then electrostatically sends the read signal to a proximately located Transceiver (Reader), which detects the carrier signal, and, under proper conditions, also the stored Transponder (Tag) information.

More recently, electronic identification (also known as radio frequency identification or RFID) techniques have been developed to address the limitations of optical barcodes.

Radio frequency identification technology has been developed by a number of companies, including Motorola/Indala (U.S. Pat. Nos. 5,378,880 and 5,565,846) Texas Instruments (see U.S. Pat. Nos. 5,347,280 and 5,541,604). These Transponder (Tag) s all attempt to provide remote identification without the need for a battery. Systems based on these markers generally operate reliably only when a single Transponder (Tag) is in the interrogation zone at a time. They also tend to be relatively bulky and expensive to manufacture.

It is further known that Radio-frequency identification ("RFID") Transponder (Tag) systems have been proposed for use in inventory tracking. In such a system, an RFID Transponder (Tag) is attached to an object or location, and contains a non-volatile memory for storing information identifying the object or location and electronic circuitry for interacting with Transceivers (Reader). RFID Transponder (Tag) s may be passive or active. In the case of a passive RFID Transponder (Tag), the Transponder (Tag) includes circuitry for converting at least a portion of the received RF signals into electrical power needed by the Transponder (Tag) for signal processing and transmission. In a typical conventional system, RFID Transponder (Tag) s containing information associated with the identities of inventory items to be tracked are attached to the inventory items. An RFID Transceiver (Reader) is used to detect the presence of an RFID Transponder (Tag) and to read the identification information from the Transponder (Tag). A typical RFID Transceiver (Reader) includes an RF Transceiver (Reader) for transmitting interrogation signals to and receiving response signals from RFID Transponder (Tag) s, one or more antennae connected to the Transceiver (Reader), and associated decoders and encoders for reading and writing the encoded information in the received and transmitted RF signals, respectively. The Transceiver (Reader) may be a portable device, which can be brought near the Transponder (Tag) s to be read, or it may be a stationary device, which reads the Transponder (Tag) s as they are brought to the Transceiver (Reader), as in the case of tagged library books being returned to a return station that is fitted with a Transceiver (Reader). RFID Transponder (Tag) s may also be affixed near a location as a location marker. After detecting both a Transponder (Tag) attached to an inventory item and a location marking Transponder (Tag), a processing unit associated with the Transceiver (Reader) may determine that the inventory item is positioned near the tagged location. While these conventional object tracking systems are capable of keeping a record of the inventory items and sometimes their locations, they are not effective for tracking and/or managing the movement of the inventory items.

U.S. Pat. No. 6,600,418 discloses an object tracking and management system and method which comprises objects to be moved between locations, outfitted with RFID Transponder (Tag) s having information relating to the identities of the objects. The locations are also marked by RFID Transponder (Tag) s containing information on the locations. A transport vehicle for moving the objects is equipped with an RFID Transceiver (Reader) capable of detecting signals from the RFID Transponder (Tag) s. An onboard processor provides the operator of the vehicle with instructions on the movement of objects. The processor also determines the identities of the objects and locations from the detected signals and provides the operator with feedback as to the identity of an object being moved, the location of the vehicle and any error in carrying out the instructions.

U.S. Pat. No. 6,329,920 teaches a portable, durable, easy-to-use, safety-oriented, long-life apparatus for reading radio frequency identification Transponder (Tag) s. This apparatus is well suited for use in connection with livestock data collection and management. The preferred embodiment includes a single wound radio frequency identification antenna coil; a radio frequency transmitter; a power control; system timing and driver including a low battery indicator; and an optical switch; a rechargeable battery; a main power switch; an infrared activation switch; a radio frequency link antenna; a receiver analog section; a micro controller; an exciter drive and a read switch; and audio feedback to confirm receipt of data.

U.S. Pat. No. 6,681,990 discloses a software application, used in conjunction with RFID devices, for the purpose of automatically tracking the inventory or number of objects in a given location. This apparatus is well suited for tracking the tagged items automatically and updating relevant personnel or external applications. This includes software programs that interact with a Transceiver to identify the Transponders within the field of the Transponder and transfer the same information to various modules of an application, specifically SAP.

WO2005001601A2 describes an XML system to transparently interact with various hardware devices like a barcode reader, RFID Transceiver etc., through XML input steams. An XML system is configured to print bar code labels, tickets, cards or other media, and/or encoded RFID devices embedded in the media, based upon an extensible markup language (XML) input data stream. This system generates a printable representation of the bar code label, tag, ticket, card, and other media and/or generates encoding information for an RFID device. This system describes a common method to present data to the data capture devices mentioned above and does not address any business context or process aspects.

U.S. patent application US20050150944A1 describes a Method for Data Interchange, addressing data interchange issues of different formats. Enterprises use various technologies for data capture and data storage. Interchanging data of disparate formats (barcode, RFID, etc.) seamlessly is the objective of the method. Opening a document having tagged information including data tags and data, performs data interchange. The data, such as data associated with data fields is updated. A target, such as a barcode, is generated based on the data tags and data. The updated data is stored and transmitted electronically and/or using the target. This method does not handle the usage of such data (i.e., adding business context to the data etc). The method describes only a data interchange between various formats.

U.S. patent application US2005139668A1 discloses a Data Acquisition Device, with the projected objective of integrating a number of data capture technologies at the hardware level. The data acquisition device is an integrated casing which houses a magnetic stripe card reader, an optical scanner, an electronic signature pad and a smart card reader, which may be an RFID, enabled device. This device is capable of collecting data seamlessly from all the mentioned technologies, and passing on such data to a computer system that the data acquisition device is connected to. This does not address the various ways to handle data after capturing such data and is operational at a hardware level.

U.S. patent application US2005159187A1 discloses an Antenna System and Method that addresses a unique method of building an antenna system that can read Transponders effectively. This method is directed towards reading a Transponder from any orientation by feeding an array of antennae covering the same field from multiple directions, each antenna providing a pointed beam. This method does not cover any location aspect and is purely based on RFID hardware construct aspects.

While all of the above are related either to hardware aspects of RFID or to point-applications (one specific area or application) using RFID devices, none of them offers flexibility to define user business process to build ANY application on RFID devices dynamically.

DRAWBACKS OF THE PRIOR ART

1. All the existing solutions are hardware centric or data acquisition centric. Existing solutions do not facilitate the users to apply business context, logic and intelligence to the data capture devices.

2. The existing solutions can be used only for the specific applications they are designed for. They address the 'Application' concern, not the business process.

3. Hard-coded business processes do not accommodate any changes in the business process itself or any changes in the way various processes interact.

4. None of the existing solutions are customizable by the user.

5. It is not possible to modify the solution once implemented for any compliance requirements.

SUMMARY OF THE INVENTION

An object of the present invention is to facilitate RFID end-users who need flexibility to define their own business process into REID grid and change the same as needed.

Another object of the present invention is facilitating Application/Solution developers who have domain knowledge of a given area and build such solutions based on Business Process Embedding Methodology.

The present invention is directed to facilitate RFID end users, who need to comply with a number of industry and federal mandates.

The foregoing objects of the invention are accomplished and the problems and shortcomings associated with prior art administration techniques and approaches are overcome by the incorporation of embedding business process and business process intelligence into an RFID hardware device (Radio Frequency Identification) grid which is an integral and central part of a RFID based business solution for any business or functional area.

The present invention relates to a business process and business process intelligence that is combined with RFID grid to allow the business process to track the turnover of movable and immovable physical objects and embedding it into an RFID (Radio Frequency Identification) grid, built of RFID (radio Frequency Identification) devices that are deployed all across the environment to cover the overall process, thereby providing the flexibility to define any application and to incorporate changes, if any, to the process grid.

The major steps involved in implementation of the present invention include:

Representing the business environment in Physical and Business context

Physical Context in terms of locations and Business Context in terms of various moveable objects and their characteristics, interrelationships, associations Embedding both above definitions into RFID hardware devices Building a business process on the basis of embedded Physical and Business Context Execution of the defined process, relevant constraints and resulting actions.

Following this procedure enables definition and execution of ANY business or functional process without any dependency on the data or information on the RFID hardware details.

Accordingly, a unique system and method for embedding business process into an RFID Grid is provided. The system includes one or more RFID hardware devices, including at least an REID Transceiver (Reader) s and antennae that reads RFID Transponders (Tags) of multiple frequencies and multiple protocols. The system further includes means for automatically formatting within the system, data collected by the RFID hardware devices. A first computer program automatically discovers, configures and controls the RFID hardware devices. A computer memory system is connected to the RFID hardware devices for storing discovery, configuration, and control data. A second computer program is used to automatically and remotely receive data from the system and to automatically generate a graphical display of all RFID hardware devices. Connection between the RFID hardware devices and the computer systems facilitates operation of the system and permit them to create representative physical locations as zones. Thus, a means is provided for creating representative physical locations as zones. A third computer program embeds location information in terms of physical business context and zone definitions into the hardware RFID devices.

The third computer program includes:

(a) a memory system to store all the outcomes mentioned above and (b) a system that includes:

(i) a computer program and its methodology that allows definition of objects as a group, assigning them characteristics and their interrelationship relevant to a business environment, and embedding the same into RFID Transponders (Tags);

(ii) a computer program and its methodology that allows business processes and business process intelligence;

(iii) a computer program and its methodology that executes the definitions above on RFID devices through communication with the system; thereby providing flexibility to define any application for any business or functional area, to incorporate any changes to the existing business process rules or business process intelligence.

The various features of novelty, which characterize the invention, are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

The system includes the following general elements:

1. Physical Contexting Module—PCM

2. Business Contexting Module—BCM

3. Business Process Definition Module—BPDM

4. Business Process Execution Engine—BPEE

Physical Contexting Module:

Physical Contexting Module (FIG. 1): The PCM is a software code running on a PC. The PCM is responsible for assigning unique IDs to the REID hardware devices and creating a Device Grid in terms of physical locations (Zones) in business terminology. The PCM embeds the Zones into the devices.

Figure 1:
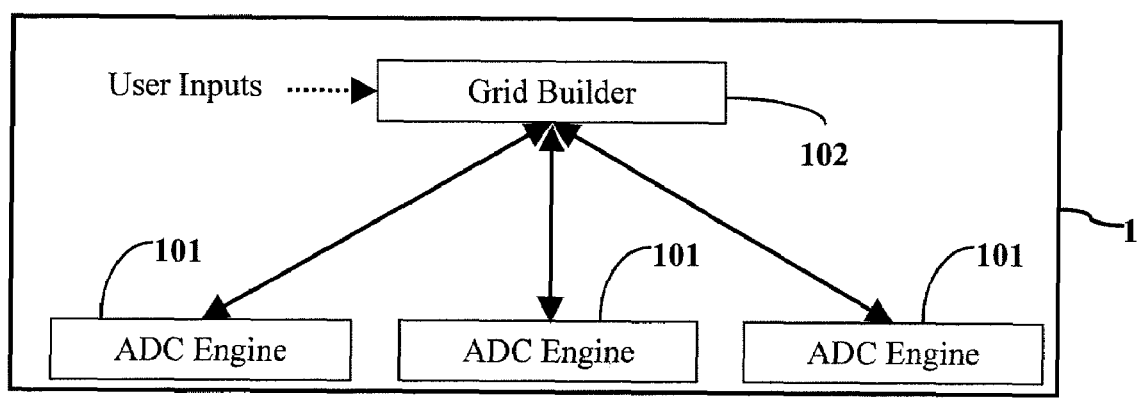
FIG. 1: Physical Contexting Module—'PCM': PCM is a software code running on a computer. PCM is responsible for assigning unique IDs to the RFID hardware devices and creating a Device Grid in terms of physical locations (Zones) in business terminology. PCM embeds the Zones into the devices.

Auto Discovery and Configuration (ADC) Engine, FIG. 1, 101 (expanded in FIG. 2): The ADC Engine, 101 of FIG. 1, is responsible for discovering the devices, configuring and assigning a unique identity to the same and other device interaction activities like Read from the device, Write to the device etc., connected to a PC or connected to the same LAN as that of the PC running the PCM seen in FIG. 1. This identifies details like Manufacturer, Model, Operating Frequency, Protocol, Communication parameters etc.

Figure 2:
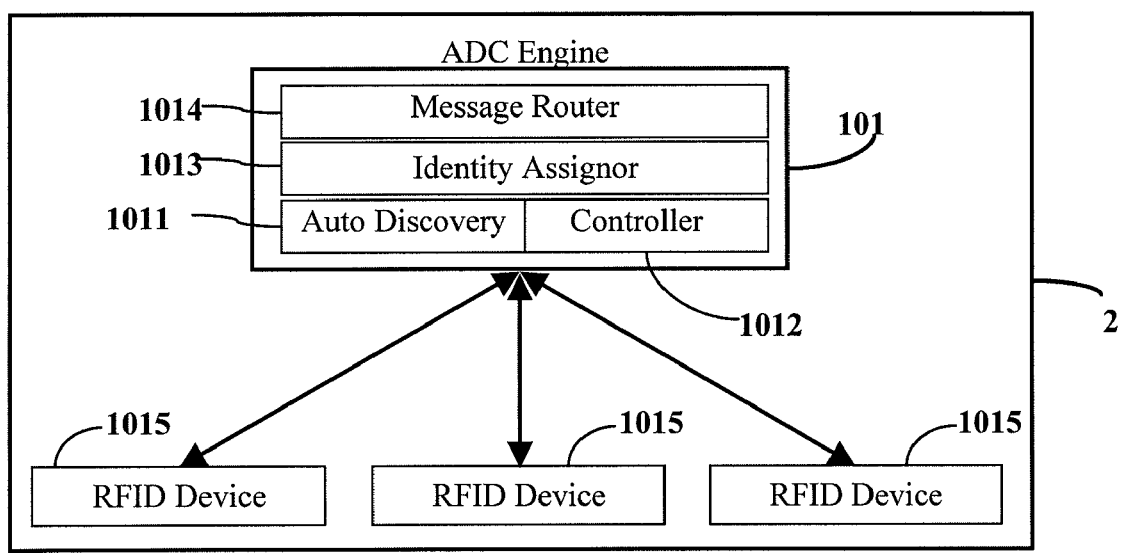
FIG. 2: ADC Engine 101 Detailed—'ADC': auto Discovery and Configuration Engine is responsible for discovering the devices connected to a computer or connected to a LAN same as that of such computer running PCM. This identifies details like Manufacturer, Model, Operating Frequency, Protocol, Communication parameters etc.

ADC Engine FIG. 2 Details: The Auto Discovery and Configuration Engines comprises:

Auto Discovery 1011: responsible for discovering the devices connected to a PC or connected to the same LAN as that of the PC running the PCM. This identifies details like manufacturer, Model, Operating Frequency, Protocol, Communication parameters etc., Controller 1012: uses the specific details discovered by Auto Discovery to communicate with the RFID devices 1015 and carry on specific actions as required by the users.

Identity Assignor 1013: assigns and tracks unique Identities to the Transceiver (Reader) s.

Message Router 1014: responsible for communication between the ADC Engine and other modules and sub-modules. The Message Router 1014 interacts with a Grid Builder and a Business Process Execution Engine (BPE), which are described in more detail below. Internally, the Message Router 1014 passes requests from the Grid Builder and the BPE to all other sub-modules of the ADC Engine.

The ADC Engine FIG. 2 performs the following functions.

Runs a software code as service on all the PCs that have the PCM FIG. 1 installed.

Identifies specifications of the RFID 3 hardware attached to the PCs or to the same LAN as that of the PC (Auto Discovery, 1011)

Assigns a Unique Identity to each device (Identity Assignor 1013)

Configures the RFID device with default parameters set in the software code (Controller 1012)

Stores the specifications, configuration and identity in an XML file and sends the same as a message to the Grid Builder, 102 of FIG. 1, (received by the Message Router 1014)

Invokes relevant commands from the Controller 1012 on the attached RFID devices as per the requests received from the Message Router 1014

Message Router 1014 receives requests from the BPE engine and Grid Builder, 102 of FIG. 14, Grid Builder (GB) of FIG. 1: The GB 102 is responsible for gathering configuration details of all the devices and displaying the Device Grid. The GB is also responsible for converting user inputs on Zone definitions and passing the same on to the ADC Engine 101 for embedding the definitions into the RFID hardware. The GB 102 displays the successfully configured Zones so that users can interact with the devices through the displayed Zone Map as the user does not need to know technical details like Device ID, Device Type, Manufacturer, etc.

The Grid Builder, 102 of FIG. 1, performs the following functions:

Receives the configuration files from all ADC engines 101 as XMLs

Uses these XML files to create a Client Grid

Presents the Client Grid to the users for defining Zones

Creates Zones based on user requirements

Converts Zone definitions into unique device Ids and maps the same and creates a Zone Map.

Embeds the Zone definitions into process definitions

Figure 6:
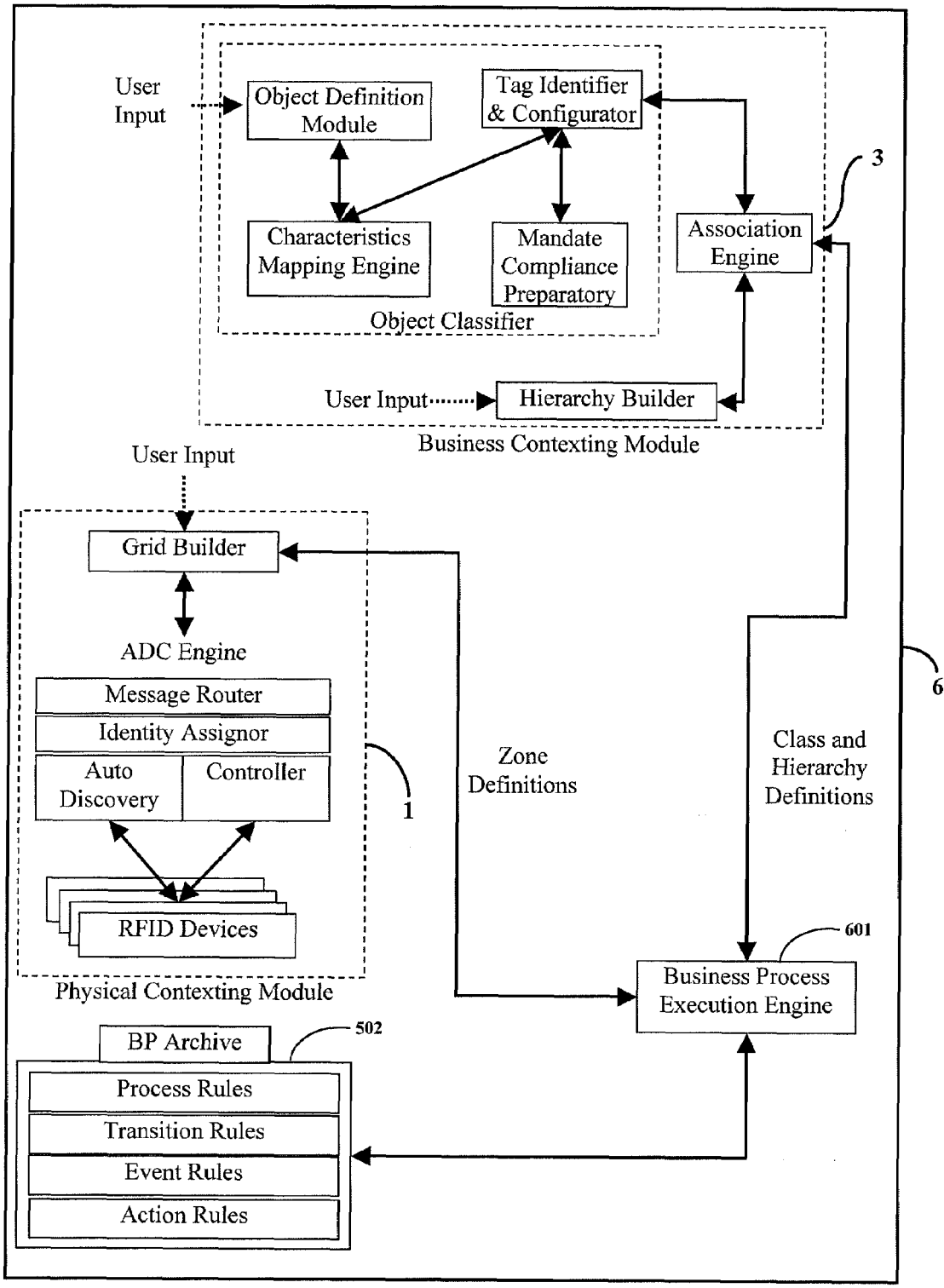
FIG. 6: Business Process Execution—'BPE', this module is responsible for executing defined business processes. BPE derives process definitions from the BP Archive 502 and executes the same. During execution, BPE interacts with PCM FIG. 1 for Zone definitions and passing on relevant requests to the hardware devices (as defined in the process—Activities assigned to a State of a Process). BPE also interacts with BCM FIG. 3 for Class and Hierarchy definitions, Association rules and mandate compliance preparatory. For each execution cycle, BPE engine refers to all of the modules.

Validates process execution in terms of Zone definitions by interacting with the BPE Engine, 601 of FIG. 6, during run time.

Facilitates communication between the ADC Engine 101 and the BPE Engine 601.

Business Contexting Module:

Business Contexting Module (FIG. 3): This module is responsible for creating Classes and assigning them a set of characteristics. These definitions are used while writing the Transponders (Tags). This module is also responsible for defining. Hierarchy and Association rules. Every time a Transponder (Tag) is read, the hierarchy and association rules are applied to the specific Transponder (Tag) for validating if all the rules are satisfied or not. The Object Classifier 4 301 groups various objects in the users' environment that are to be tagged, into Classes.

Figure 3:
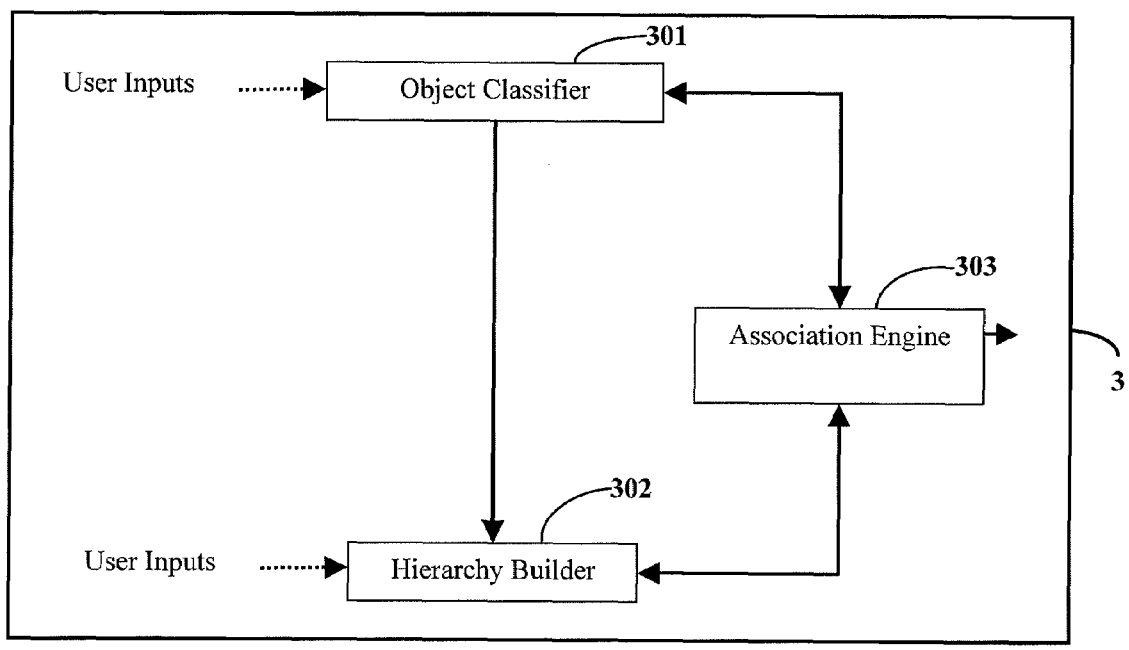
FIG. 3: Business Contexting Module—'BCM': this module is responsible for creating Classes and assigning them a set of characteristics. These definitions are used while writing the Tags. This module is also responsible for defining Hierarchy, and Association rules. Every time a tag is read, the hierarchy and association rules are applied to the specific tag for validating if all the rules are satisfied or not.

Object Classifier (OC), 301 of FIG. 3 (expanded in FIG. 4): The Object Classifier 301 groups various objects in the users' environment that are to be tagged, into Classes.

Figure 4:
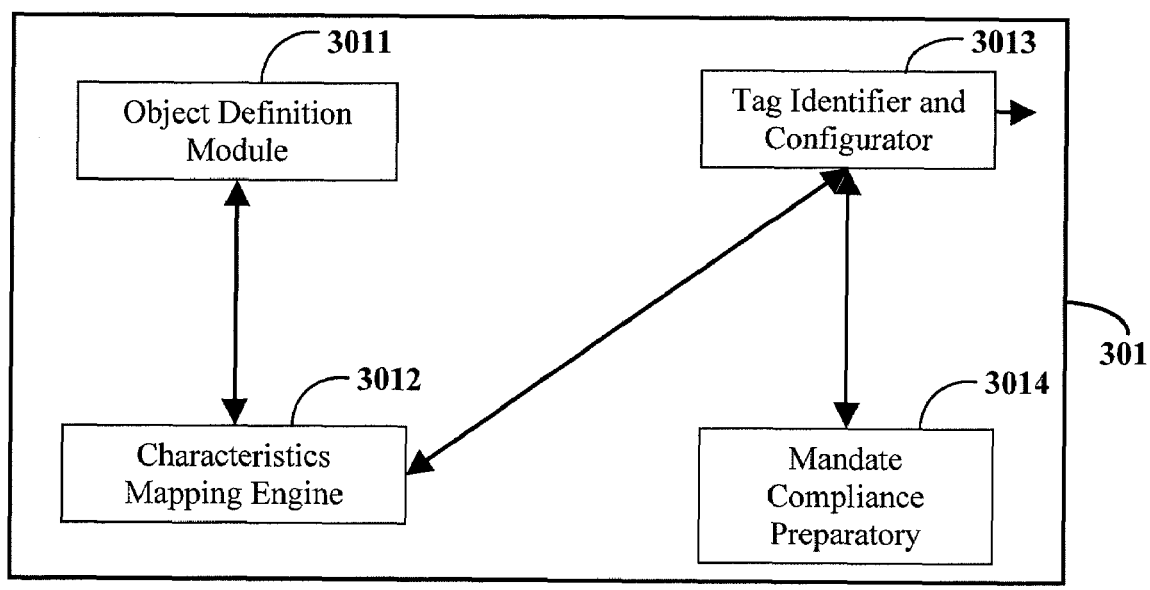
FIG. 4: Object Classifier 301 Detailed—'OC': describes the constituents of OC. Object Classifier defines various Classes, their characteristics and maps the same. OC also identifies the Tag type used for Tagging a specific object, validates if the Tag type falls in line with other definitions like Mandate Compliance Preparatory, number of characteristics to be written on to the Tag and checks if the data size matches available memory blocks on the Tag. This also checks for Reader and Tag type/protocol compliance.

Object Classifier (OC) FIG. 4 Details: Describes the constituents Of OC. The Object Classifier, 301 of FIG. 4, defines various Classes, their characteristics and maps the same. The OC 301 in FIG. 4 also identifies the Transponder (Tag) type used for Tagging a specific object, validates if the Transponder (Tag) type falls in line with other definitions like the Mandate Compliance Preparatory (MCP 3014), the number of characteristics to be written on to the Transponder (Tag) and checks if the data size matches available memory blocks on the Transponder (Tag). The OC, 301 of FIG. 4, also cheeks for Transceiver (Reader) and Transponder (Tag) type/protocol compliance. The Object Classifier, 301 of FIG. 4, has sub components—Object Definition Module (3011), Characteristics Mapping Engine (3012), Transponder (Tag) Identifier and Configuration (3013), and Mandate Compliance Preparatory (3014), as described in more detail below.

Object Definition Module 3011 of FIG. 4: Creates Classes and defines characteristics for each Class. All the moving and moveable objects in the users' environment are grouped into Classes based on shared characteristics (e.g., employees of a division, employees of the same rank, tooth paste (20 gms) blue gel, tooth paste (200 gms) red gel, etc). This sub module defines all such Classes. Each Class has a given set of characteristics that are shared across all the objects that belong to this Class. The Object Definition Module 3011 allows definition of the number of characteristics, type of each characteristic (text, number, date, time, email address, etc.), where to derive this from during the run time (a specific set of values either manually entered or taken from an existing database such as all employee codes from HRMS)

Characteristics Mapping (CM) Engine 3012 of FIG. 4: The CM Engine maps the set of characteristics defined for each Class to all the Objects that belong to the Class. All the characteristics defined above are mapped to specific objects that belong to the relevant Class. During run time, while writing, specific values of the characteristics are assigned to each Transponder (Tag). A reference to the Transponder (Tag) ID and a pointer to the set of values are mapped and stored internally. The values can also be stored on the Transponder (Tag) without a reference to a table if the Transponder (Tag) memory matches the data size. During run time, while reading, every Transponder (Tag) read is scanned for the Transponder (Tag) ID and the same is used to retrieve assigned values of the characteristics. The CM engine 3012 is responsible for these run time functions.

Transponder (Tag) Identifier and Configurator (TIC) 3013 of FIG. 4: The TIC 3013 is responsible for identifying the Transponder (Tag) details like Transponder (Tag) type, Protocol, usable memory space, data blocks etc., and correlates the same with the data (Values of Characteristics defined for a Class) to be written on to the Transponder (Tag). The TIC 3013 also validates if the Transponder (Tag) type falls in line with other definitions like the mandate Compliance Preparatory 3014 (discussed in more detail in the next paragraph) and the number of characteristics to be written on to the Transponder (Tag). The TIC 3013 checks if the data size matches available memory blocks on the Transponder (Tag). The TIC 3013 also checks for Transceiver (Reader) and Transponder (Tag) type/protocol compliance.

Mandate Compliance Preparatory (MCP) 3014 of FIG. 4: This module is responsible for setting up requisite parameters to comply with various mandates (e.g., Wal-Mart mandate, DoD mandate etc.). Each mandate has a set of parameters that are one-time configurable and other data format and data exchange requirements. This module prepares the environment for mandate compliance by including one-time definitions like CAGE code, Company Prefix and Item Reference Numbers. The suppliers invoke the compliance environment thus created while writing Transponders (Tags) for mandate complaint consignments.

Hierarchy Builder (HB) 302 of FIG. 3: This module of the business contexting module, organizes the Classes according to the existing hierarchy in the users' business environment. Hierarchy builder works on Class definitions only and not on objects. A defined hierarchy works as a skeleton and when the Tagged objects are sensed by the RFID devices, Association Engine, 303 of FIG. 3, described in the next paragraph, uses the hierarchy skeleton to validate if all the Tagged objects are falling within the Hierarchy definitions.

Association Engine (AE) 303 of FIG. 3: This module of the business contexting module correlates all the Classes assigned to Hierarchy definitions and specific objects that belong to the Classes. The association engine also interacts with the BPE engine, 601 of FIG. 6, for sending hierarchy validations out.

All the Classes are interlinked according to the business requirements. Each relation has constraints. These definitions—interlinks and constraints are built by Hierarchy Builder, 302 of FIG. 3. In the example of Pallet-Case-Item, Item Class is a child of Case Class, which in turn is a child of Pallet Class. Another example is Employee-Laptop. Laptop Class is a child of Employee Class—in this scenario, a given Laptop (an object of Laptop Class) may be assigned to multiple employees (Employee 1 and his/her boss) defusing a multiple parent relationship. Multiple parent relationship is not possible in cases like Pallet-Case-Item Hierarchy.

Business Process Definition Module:

Business Process Definition Module (FIG. 5): This module is responsible for defining a user's business process by using the context definitions from the PCM of FIG. 1 and BCM of FIG. 3. These definitions are stored in a Business Process Archive 502 of FIGS. 5 and 6, to be used by a Business Process Execution Engine 601 of FIG. 6 during run time. This module ensures that the defined process is based on process elements like Zones, Classes, Hierarchy, Association, etc., that describe the user's environment and are defined in the PCM (FIG. 1) and BCM (FIG. 3). This also allows the user to set rules to the processes—Transitions Rules, Event Rules and Action Rules.

This module is responsible for defining a user's business process by using the Zone, Class and Hierarchy definitions from the PCM (FIG. 1) and BCM (FIG. 3).

All the physical locations in the user's business environment are mapped as Zones by embedding Zone definitions into RFID devices through the Physical Contexting Module (FIG. 1).

All the objects that need to be Tagged are mapped as Classes by defining specific characteristics to be mapped to Transponder (Tag) IDs while writing the Transponders (Tags), using the Business Contexting Module (FIG. 3). Inter-relations are defined as Hierarchies.

Both the PCM (FIG. 1) and BCM (FIG. 3) cover the entire business organization that is planned to be addressed by RFID. The Business Process Definition Module (FIG. 5) uses these definitions to build various processes as required by the user, integrates the same with definitions derived from PCM (FIG. 1) and BCM (FIG. 3), and defines various Rules for validating process compliance. Through this exercise, this module embeds the business process definitions into the RFID devices in terms of physical locations as well as objects. This approach allows for defining any business process quickly and deploys the same on the RFID infrastructure. This is possible because of the building blocks created by PCM (FIG. 1) and BCM (FIG. 3) and the way process definition and execution are carried out.

Apart from interacting with PCM (FIG. 1) and BCM (FIG. 3) for deriving the definitions mentioned above, this module has the following components.

Figure 5:
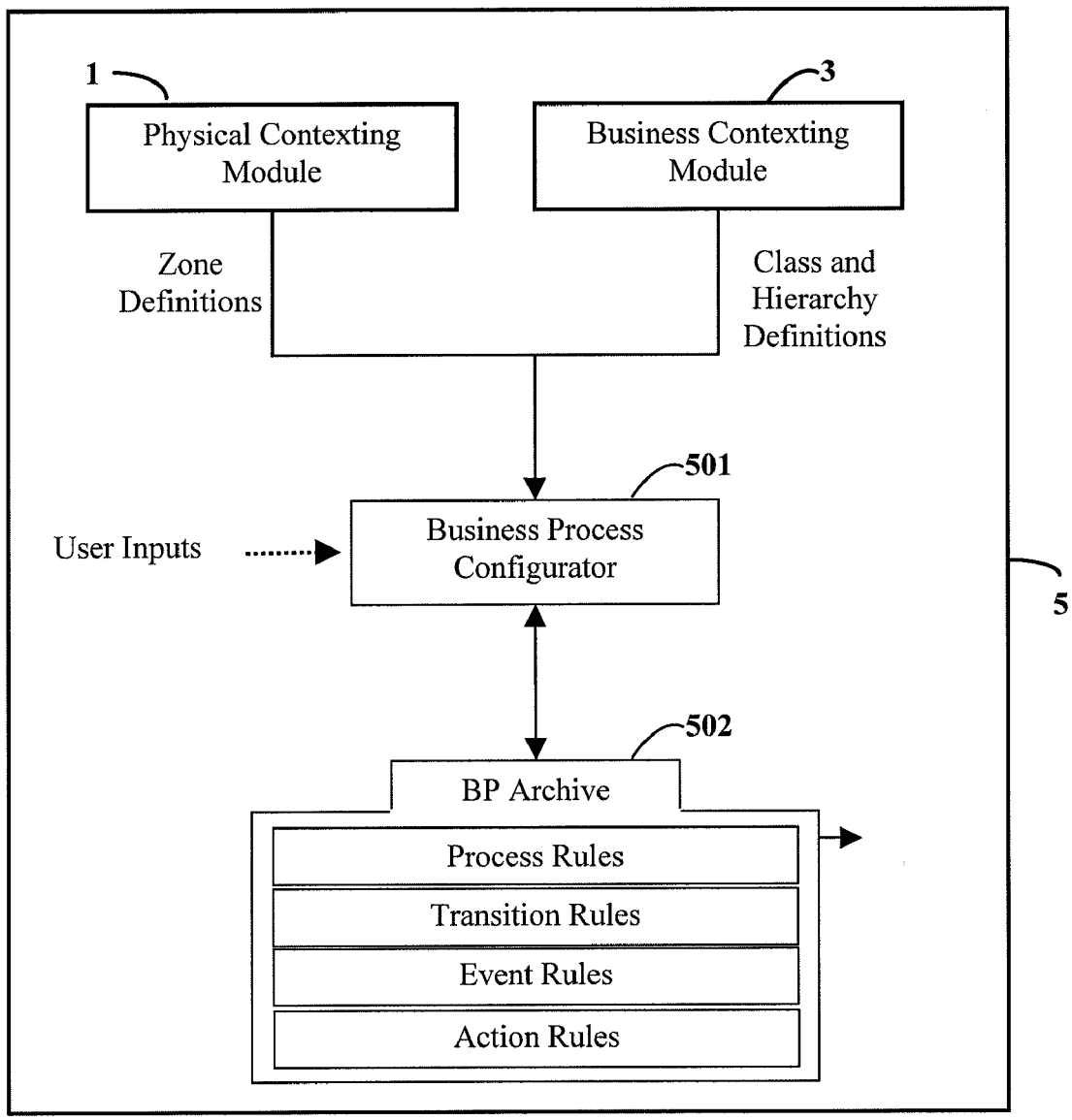
FIG. 5: Business Process Definition Module—'BPDM': this module is responsible for defining users' business process by using the context definitions from PCM FIG. 1 and BCM FIG. 3. These definitions are stored in Business Process Archive 502, to be used by Business Process Execution Engine 601 during run time. This module ensures that the defined process is based on process elements like Zones, Classes, Hierarchy, Association etc that describe the users' environment and are defined in PCM FIG. 1 and BCM FIG. 3. This also allows the users to set rules to the processes—Transitions Rules, Event Rules and Action Rules.

Business Process Configurator 501 of FIG. 5: This module is responsible for creating business processes according to the user specifications. Business Process Configurator 501 derives Zone definitions from PCM (FIG. 1) and Class and Hierarchy definitions from BCM (FIG. 3), builds process definitions based on zones and Classes thus derived and creates process definition in BPEL and XML. A process definition comprises a unique process name, various states that belong to the process, their transition rules, and event and action rules.

BP Archive 502 of FIGS. 5 and 6: This module is responsible for storing all the process definitions and interacting with the BPE Engine, 601 of FIG. 6, during the runtime. The BP Archive 502 exchanges references to various components of the process definition like Process Rules, Transition Rules, Event Rules, Action Rules and also the environmental parameters like Zones, Classes and Activities assigned to a specific State or States assigned to a given process, etc. with the Business Process Execution Engine 601.

Figure 7:
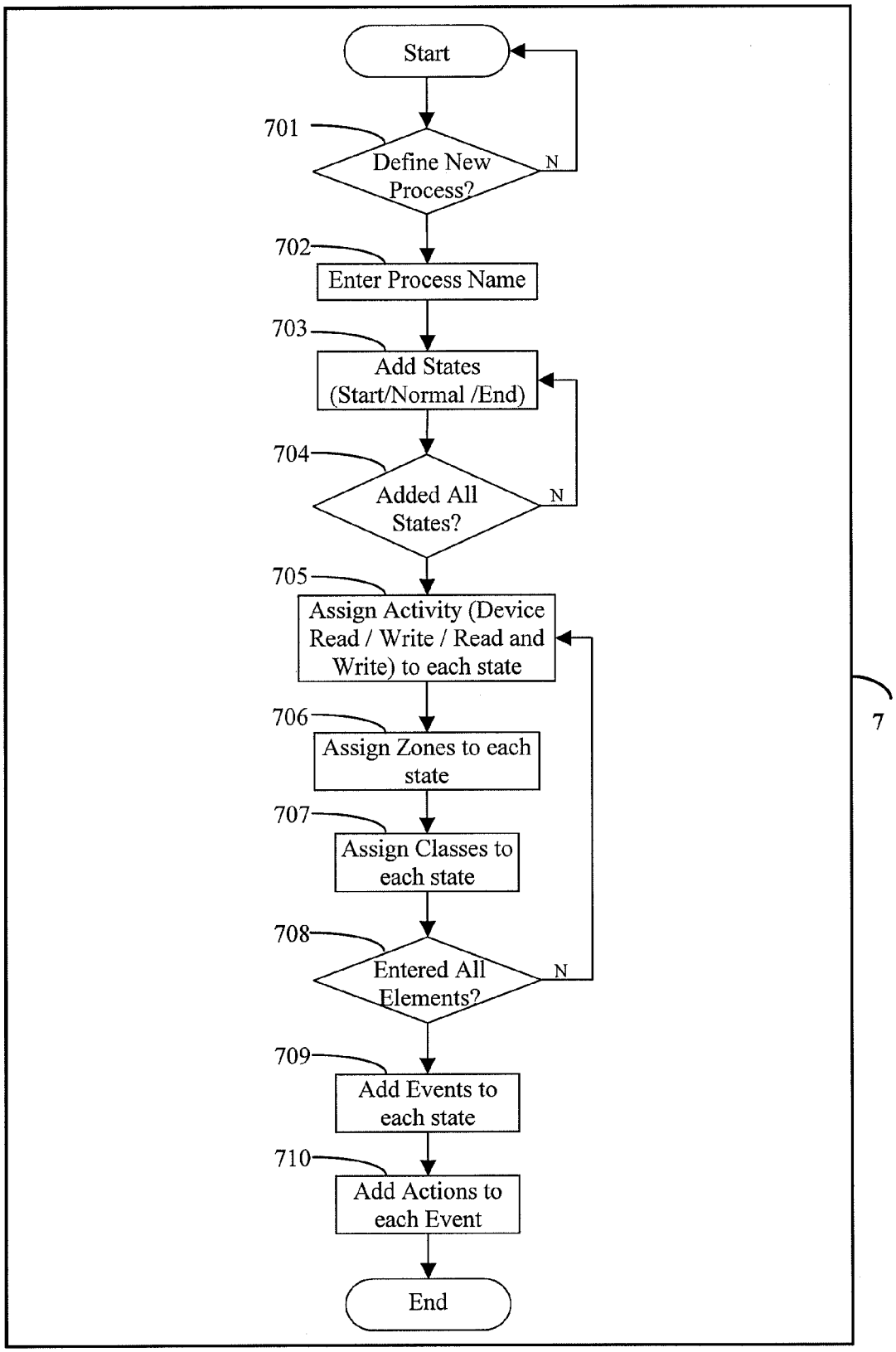
FIG. 7: Business Process Definition Flowchart: this flowchart shows the procedure for "defining" a business process using components mentioned as described in above.

A detailed workflow for "defining" a business process is presented in Business Process Definition Flowchart (FIG. 7) wherein:

701. The user is prompted to define a new process.

702. The user enters the process name. The Business Process Configurator, 501 of FIG. 5, assigns a unique ID for each process.

703. The Business Process Configurator, 501 of FIG. 5, has three predefined States—Start State as the starting State of a Process, End State as the last State of a Process and Normal State for any number of intermediary States. The user selects various States and assigns unique names to the same.

704. A process must have one Start State and one End State. Each State must have transition rules assigned to them. If these conditions are satisfied, the Business Process Configurator, 501 of FIG. 5, takes the user to the next step.

705. The Business Process Configurator, 501 of FIG. 5, has three predefined Activities—RFID Read, RFID Write and RFID Write/Read. The user is prompted to assign an Activity to the defined States.
706. The Business Process Configurator, 501 of FIG. 5, derives Zone definitions from the PCM (FIG. 1) and prompts the user to assign the Zones to each State.
707. The Business Process Configurator, 501 of FIG. 5, derives Class definitions from the BCM (FIG. 3) and prompts the user to assign the Classes to each State.
708. If all the process elements (Activity, Zone and Class) are added, the Business Process Configurator, 501 of FIG. 5, allows the user to move to the next step.
709. The Business Process Configurator, 501 of FIG. 5, fetches all characteristics of the assigned Classes and prompts the user to define Event on the basis of the derived characteristics. Events are assigned to States.
710. For each event, a predefined or custom-scriptable Action has to be assigned.

This completes the Business Process Definition. Business Process Configurator 501 of FIG. 5, organizes Business Process Definitions as Process Rules, Transition Rules, Event Rules and Action Rules mapped to unique Process Ids and stores the definitions in the BP Archive 502 of FIGS. 5 and 6.

Business Process Execution

Business Process Execution (FIG. 6): This module is responsible for executing defined business processes. The BPE Engine 601 derives process definitions from the BP Archive 502 and executes the same. During execution, the BPE Engine 601 interacts with the PCM (FIG. 1) for Zone definitions and passing on relevant requests to the hardware devices (as defined in the process—Activities assigned to a State of a Process). BPE Engine 601 also interacts with the BCM (FIG. 3) for Class and Hierarchy definitions, Association rules and mandate compliance preparatory. For each execution cycle, the BPE engine 601 refers to all of the modules mentioned.

The BPE Engine 601 is a software program running on a PC responsible for executing the defined business process. It may run on the same PC as other components (PCM FIG. 1/BCM FIG. 3/BPDM FIG. 5) or a different PC.

Figure 8:
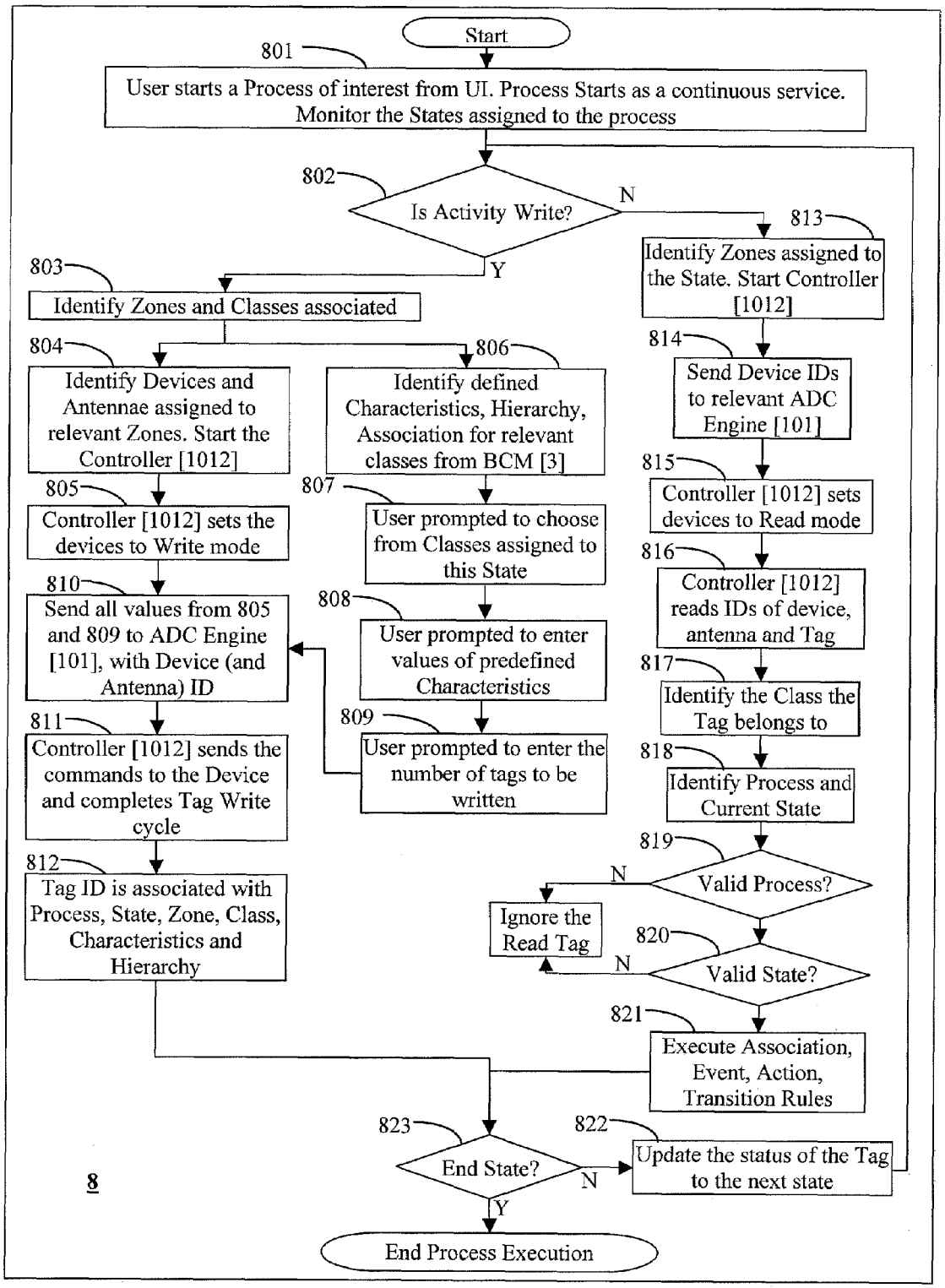
FIG. 8: Business Process Execution Flowchart: this flowchart describes the "execution" sequence of the business process defined as in FIG. 7: Business Process Definition Flowchart.

BPE Engine 601 fetches process definitions from the BP Archive 502 to a temporary storage location within itself. Once the user initiates a process, the BPE Engine 601 runs a continuous service that takes care of execution. Various steps in executing the process (Business Process Execution Flowchart FIG. 8) are shown below:

801. Once the user initiates a process, the BPE Engine, 601 of FIG. 6, runs a continuous service that takes care of execution.

The service checks for the all the States, other components like Activities, Zones, Classes, Hierarchy and other Rules assigned to the process.

802. Once the Activities and zones related to a specific process are identified, the BPE, Engine 601, instructs the PCM (FIG. 1) to activate specific modes as defined in Activities on the RFID Transceiver (Reader) s that fall under the Zone definitions. For example, for a given State, if the assigned activity is "Read" and the assigned zone is "Receiving Dock", the BPE Engine 601 instructs the PCM FIG. 1 to activate read mode on the RFID Transceiver (Reader) s and Antennae that are embedded with IDs constituting "Receiving Dock" Zone. These activities are done separately for each mode—Read and Write, though the working is similar. Details are explained in relevant sections below.

The PCM FIG. 1) controls the Transceiver (Reader) s and runs the same in the mode as instructed by the BPE Engine 601. For every Transponder (Tag) Read or Written within the Process Definition, a Process Instance is created by the BCM FIG. 3, which is alive for the life cycle of the tagged objects through all States of the current process.

803. If the assigned Activity to the State is Write—BPE Engine, 601 of FIG. 6, identifies the Zone and Classes associated.

804. BPE Engine, 601 of FIG. 6, instructs the PCM (FIG. 1) to identify and activate Write as defined in Activities on the RFID Transceiver (Reader) s that fall under the zone definitions. For example, in a given State, if the assigned activity is "Write" and the assigned zone is "Receiving Dock", the BPE Engine 601 instructs the PCM (FIG. 1) to activate write mode on the RFID Transceiver (Reader) s and Antennae that are embedded with IDs constituting "Receiving Dock" Zone. This is achieved by starting the Controller process of the ADC Engine, 101 of FIG. 1.

805. The activated Controller, 1012 of FIG. 2, sets the relevant RFID Transceiver (Reader) to write mode.

806. The BPE Engine, 601 of FIG. 6, fetches the details of the Classes, their characteristics, Transponder (Tag) Configuration, Hierarchy and Association details for the classes that belong to the State, from the BCM (FIG. 3).

807. The user selects a Class of interest out of those displayed. An object that belongs to this specific class can be tagged now by Writing the Transponder (Tag).

808. Inputs from the user for specific values of the characteristics are taken.

809. The user enters the number of Transponders (Tags) to be written within the same session. The user is prompted to repeat steps 8-9 until all the Transponders (Tags) are written.

810. The BPE Engine, 601 of FIG. 6, sends all the above values to the ADC Engine, 101 of FIG. 2, along with Transceiver (Reader) and Antenna Ids.

811. The Controller, 1012 of FIG. 2, sends the details to the RFID Transceiver (Reader) and instructs the Transceiver (Reader) to write into the Transponder (Tag).

812. After Writing, the Transponder (Tag) ID is associated with the Process, State, Zone, Class, specific Characteristics and Hierarchy by the BPE Engine, 601 of FIG. 6. This completes the Write cycle.

813. The BPE Engine, 601 of FIG. 6, identifies all Zones assigned to the State from the PCM (FIG. 1) and instructs the ADC Engine, 101 of FIG. 2, to start the Controller, 1012 of FIG. 2, for relevant RFID Transceiver (Reader) s in the Zones.

814. The ADC Engine, 101 of FIG. 1, sends the RFID Transceiver (Reader) IDs to the Controller, 1012 of FIG. 2, along with instructions to set the Transceiver (Reader) to Read Mode.

815. The Controller, 1012 of FIG. 2, sets the RFID Transceiver (Reader) to Read mode.

816. Every Transponder (Tag) Read is passed on to the BPE Engine, 601 of FIG. 6.

817. The BPE Engine, 601 of FIG. 6, checks for the Class that the current Transponder (Tag) belongs to, through the BCM (FIG. 3).

818. The BPE Engine, 601 of FIG. 6, identifies the Process and current State in terms of State definitions.

819. The BPE Engine, 601 of FIG. 6, considers the Read only if the Process is a valid Process for the specific Transponder (Tag). Otherwise, the Read is ignored.

820 The BPE Engine, 601 of FIG. 6, then checks if the current State of the Transponder (Tag) falls in line with Process Definitions by checking with the Business Process definition in the BP Archive, 502 of FIG. 5

821. If the current State is valid, the BPE Engine, 601 of FIG. 6 executes Event Rules. If all the Event rules are met with, the Transponder (Tag) data, Time Stamp and other details are stored internally (this is used for tracking the path of the tagged object). If not, Events are generated. For each Event generated, assigned Action Rules are executed and relevant action taken. The BPE Engine 601 then executes Transition Rules for the current State.

822. Based on Transition Rule's validity, the BPE Engine, 601 of FIG. 6, updates the status of Transponder (Tag) to the next State as per the Process Definition.

823. This procedure is continued until the tagged object reaches the End state. The Process Instance for the specific object is terminated. The process execution for other tagged objects that belongs to the current process continues.

Terminology:

Activity
    Activity is the function to be undertaken during a particular state of the business process.
    It can be Read [the RFID tags], Write [onto the RFID tags], or Read/Write.

Association
    Association is the definition of the relation between Classes.
    For example, one can associate Employee and Asset, Pallets and Cases etc.
    Such association of Classes helps in defining business process.

Class
    Class is a set of uniquely identifiable RFID tagged objects or entities, within a particular business enterprise.
    For e.g. Pallets, Cases, Items, Employees are Classes, which comprise objects like pallet 1, pallet 2, item 1, item 2, etc.

Client Grid
    It is a schematic representation of all the computers (loaded with the computer programs mentioned in this document) in the environment along with their details like type of OS, number of ports, ports that are available and ports, which are used.
    This allows the user to add new readers.

Characteristics
    The set of values describing a Class is stated as a Form.
    E.g. Pallet Number, Employee Code, Item Type, etc.

Hierarchy
    Hierarchy is the order of the Classes arranged in Levels.
    Each Level has a set of unique Class names.
    There can be more than one Class at each Level.
    For example Pallets-Cases-Items, Manager-Foreman-Worker, etc.

This helps the user both while writing and reading the tags by enforcing a concrete relationship among the participating Classes State
    State is a particular stage in the business process.
    For e.g. in a WMS process, various states would be Receiving, Binning, Picking and Shipping.
        START State. It is the first State in the business process. For the above example the START State would be 'Receiving'.
        NORMAL State: This is the state following the START State. There can be many NORMAL States between START and END States.
        END State: The last State of a business process is the END State Zone
    A Zone indicates a unique business area of an enterprise in the functional context e.g. Warehouse, Packaging station etc.
        Clubbing the antennas in one particular physical location forms the locations.
    This will help the user to identify the physical location of a particular reader so as to replace it during malfunction.
    It will also allow the user to define his business process since the
    Zones would reflect the physical definitions of the business enterprise.

Zone Map
    A schematic representation of the environment displaying all computers loaded with the computer programs mentioned in this document with details (type of ports, no. of ports, etc.), readers connected to such computers with details (type of reader, etc.), antenna for readers (along with antenna id) clubbed in terms of logical groups shown as Zones.

Software used for defining existing business process onto the grid thereby linking the process to various REID devices in the grid is listed below:

JSP (Java Server Pages) and Struts for process definition, EJB (Enterprise Java Beans) for accessing the definitions stored in databases, Jini Services for control interaction with various RFID devices and Java Messaging Service for Data extracting and transportation to and from the RFID devices.

The process is independent of software used and can be built using any programming language having the capabilities of all the components (JSP, Struts, EJB, Jini and JMS) mentioned above.

ADVANTAGES OF THE PRESENT INVENTION

1. The same methodology accommodates "any" application by defining the application specific business process based on the Transceiver (Reader) s. Other players have RFID solutions hard-coded for various application areas, which cannot be customized or modified by the user.

2. Any changes in the process can be easily included in the RFID grid by modifying the process linkages with RFID devices accordingly. For other players, this means a re-working of the existing deployment.

3. Compliance with any process standards (ISO etc.,) or industry mandates (Wal-Mart etc.,) or federal mandates (Sarbanes Oxley Act etc.,) is simply defining the process accordingly. No additional effort is needed. Other players release specific modules for each compliance module that cannot be modified.

4. Because the process definition exists in terms of business processes of the end-user, users themselves can add/modify/delete the processes, without bothering about RFID devices. For other players, modification is an exercise that can be done only by qualified RF engineers, with the help of the end-users, which is inefficient and time consuming.

5. A decision facilitated by applying business context as defined in the present invention, can be executed by interaction with the RFID hardware devices by giving the devices feedback.

While a specific embodiment of the invention has been shown and described in detail to illustrate the application of the principles of the invention, it will be understood that the invention may be embodied otherwise without departing from such principles.

What is claimed is:

1. A system for embedding business process into an RFID grid comprising:
   one or more RFID hardware devices, including at least an RFID Transceiver(Reader) and antennae that read RFID Transponders (Tags) of multiple frequencies and multiple protocols;
   a first computer program for automatically discovering, configuring and controlling the RFID hardware devices,
   a computer memory system connected to the RFID hardware devices, for storing discovery, configuration, and control data;
   a second computer program used to automatically and remotely receive data from the system and to automatically generate a graphical display of all RFID hardware devices, wherein a connection between the RFID hardware devices and the said first and second computer programs permit creating representative physical locations as zones, and
   a third computer program that embeds location information in terms of physical business context and zone definitions into the hardware RFID devices.

2. A system according to claim 1, further comprising means for automatically formatting data collected by the RFID hardware devices.

3. A system according to claim 2 wherein the third computer program includes:
   a memory system for storing all outcomes; and
   a fourth computer program that allows definition of objects as a group, assigning them characteristics and their interrelationship relevant to a business environment, and embedding the same into RFID Transponders (Tags);
   a fifth computer program that allows business processes and business process intelligence; and
   a sixth computer program that executes definitions on RFID devices through communication with the system;
thereby providing flexibility to define any application for any business or functional area, to incorporate any changes to the existing business process rules or business process intelligence.

4. A system according to claim 1, wherein said RFID Transceiver (Reader) s, including antennae are connected to a LAN for storing discovery, configuration, and control data.

5. A method for embedding business process into an RFID grid comprising the steps of:
   providing one or more RFID hardware devices, including at least an RFID Transceiver (Reader) s and antennae that read RFID Transponders (Tags) of multiple frequencies and multiple protocols;
   automatically discovering, configuring and controlling the RFID hardware devices;
   storing discovery, configuration, and control data;
   receiving data from the system to automatically generate a graphical display of all RFID hardware devices;
   creating representative physical locations as zones;
   embedding location information in terms of physical business context and zone definitions into the hardware RFID devices.

6. A method according to claim 5, wherein the step of embedding location information comprises the steps of:
   storing all outcomes of the previous steps;
   defining objects as a group;
   assigning them characteristics and their interrelationship relevant to a business environment;
   embedding them into RFID Transponders (Tags); and
   executing definitions on RFID devices through communication with the system, thereby providing flexibility to define any application for any business or functional area, to incorporate any changes to the existing business process rules or business process intelligence.

* * * * *